*INVENTOR.*
ROBERT B. HAY

United States Patent Office 3,334,858
Patented Aug. 8, 1967

3,334,858
SWINGING DISC VALVES WITH SUPPLEMENTAL OPERATOR
Robert B. Hay, 100 Appleton St., North Andover, Mass. 01845
Filed July 2, 1964, Ser. No. 379,832
7 Claims. (Cl. 251—82)

This invention relates to valves and in particular to an improved swinging disc stop check valve.

At present there is a distinct need for a swinging disc valve that can effectively and dependably confine relatively high line pressures existing on that side of the valve which tends to force it open. While some valves of this general type are available or have been described in the literature, for example, in U.S. Patent No. 1,055,215, each of the valves known heretofore, suffers from significant disadvantages. In most cases, valves known heretofore are either unable to effectively confine high pressures when closed or result in a high pressure drop when open. In contrast thereto, the present valve combines the low pressure drop characteristics of swinging disc valves with the effective and positive shut-off characteristics of gate valves; thus the present valve can often be utilized where two valves were necessary heretofore.

Accordingly, it is a principal object of the present invention to provide a novel swinging disc stop check valve.

It is another object of the present invention to provide an improved swinging disc stop check valve which effectively contains high pressures.

It is another object of the present invention to provide an improved swinging disc stop check valve which results in a low pressure drop when open.

It is another object of the present invention to provide an improved swinging disc stop check valve which requires relatively little effort to close.

Other objects of the present invention will in part be obvious and will in part appear hereinafter.

In order to gain a better understanding of the present invention reference should be had to the following detailed description taken together with the accompanying drawings wherein.

Figure 1:
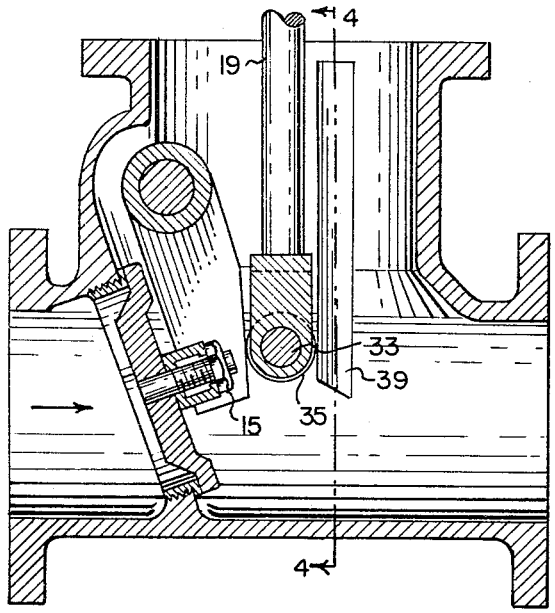
FIGURE 1 is a schematic cross-sectional illustration of a preferred embodiment of the swinging disc valve of the present invention in the fully closed position.
Figure 2:
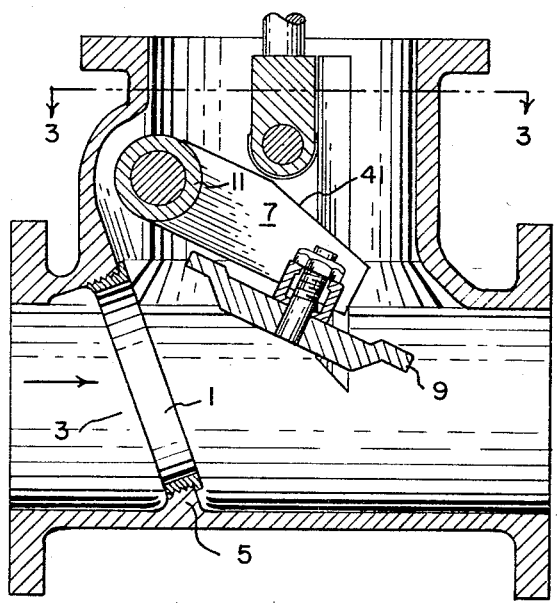
FIGURE 2 is a cross-sectional view of the valve illustrated in FIGURE 1 in the open position.
Figure 3:
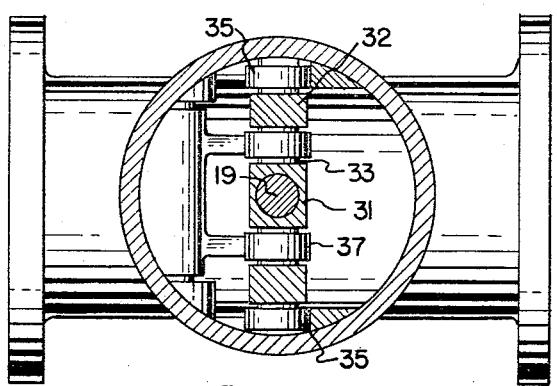
FIGURE 3 is a cross sectional view of the valve illustrated in FIGURE 2 taken along lines 3—3.
Figure 4:
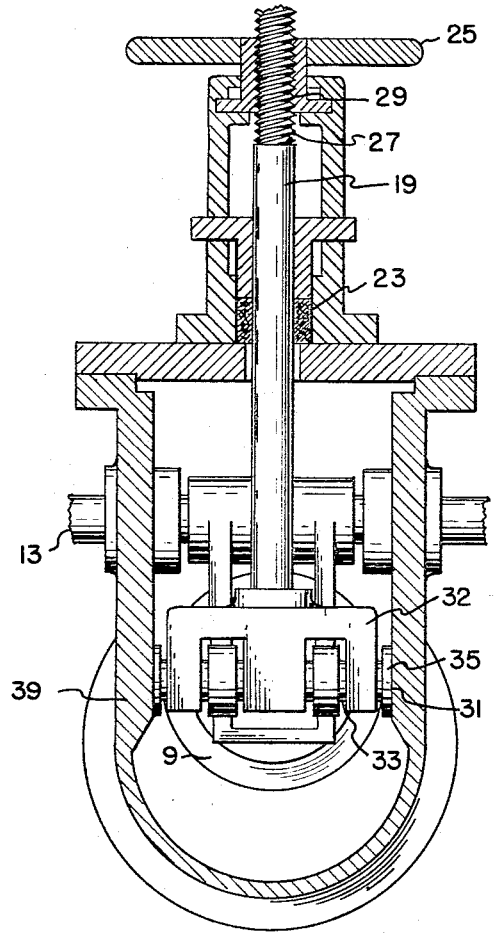
FIGURE 4 is a cross-sectional view of the valve illustrated in FIGURE 1 taken along lines 4—4.

Referring now to FIGURES 1–4 wherein like numbers refer to like parts, seat 1 positioned about inlet 3 is positioned in body 5 at any appropriate angle such that disc arm 7 (and disc 9) is substantially out of the line of flow when disc arm 7 is in the fully open position as shown in FIGURE 2. Disc arm 7, which can be counterbalanced or not as desired, is keyed at its top 11 to shaft 13 which extends into or through, and is preferably supported by, body 5. Disc 9 can be integral with disc arm 7 or can be attached thereto in any convenient manner. Preferably, however, disc arm 7 and disc 9 comprise individual units which are affixed to each other so as to allow a small amount of play therebetween. The reason for this will be discussed in more detail hereinafter. Suffice it to say for the time being, that a small amount of play results in a self-aligning feature. Note, however, that it is necessary, when disc arm 7 is in the open position illustrated in FIGURE 2 and a medium is flowing through inlet 3 in the direction of the arrow, that disc arm 7 support disc 9 in the open position until (a) flow through inlet 3 stops or sufficiently diminishes (where disc arm 7 is not counterbalanced) to allow disc arm 7 to close, or (b) until sufficient force is applied to surface 41 of disc arm 7 as explained in detail hereinafter to force disc arm into the closed position.

The manner in which disc 9 is supported by or connected to disc arm 7 is not critical to the present invention and any means or assembly which will accomplish the above-explained results can be utilized.

Assuming now that disc arm 7 (and disc 9) is in the valve-open position and either that disc arm 7 is counterbalanced or that sufficient pressure exists in the area of inlet 3 to maintain disc arm 7 in the valve-open position, the appearance of the swinging disc valve of the present invention is best illustrated by FIGURE 2. At this point in order to force disc arm 7 (and disc 9) toward seat 1, stem 19 which passes in an axially movable manner through seal 23 is rotated in any convenient manner such as by means of handwheel 25, so that threaded portion 27 engages threads 29 causing stem 19 to move downwardly. Operator assembly 31 which is preferably rigidly affixed in any convenient manner to the bottom of stem 19 likewise begins to move downwardly with stem 19. Operator assembly 31 comprises operator housing 32 through which extends shaft 33 which acts as an axle for outer rollers 35 and inner rollers 37. As stem 19 moves downwardly, outer rollers 35 which are in contact with track 39, track 39 being preferably integral with body 5, roll down track 39. Note, moreover, that outer rollers 35 are prevented by track 39 from moving in the direction of flow, thereby preventing any motion in the direction of flow by operator assembly 31 and/or stem 19. At the same time, inner rollers 37 which are positioned upon shaft 33 so as to come in contact with surface 41 of disc arm 7 when stem 19 moves downwardly likewise move downwardly, thereby increasingly causing the bottom end of disc arm 7 and disc 9 to rotate about shaft 13 in the direction of inlet 3 and seat 1. As stem 19 continues to move operator assembly 31 downwardly, outer rollers 35 continue to move downwardly along track 39 thereby continuously supporting operator 31 and stem 19 against the forces being applied thereto in the direction of flow, while inner rollers 37 continue to force the bottom end of disc arm 7 (and disc 9) toward inlet 3 and seat 1 until eventually disc 9 becomes seated in seat 1 thereby effectively cutting off all flow. As disc arm 7 comes into contact with seat 1, the existence of play between disc 9 and disc arm 7 results in disc 9 being self-aligning which self-aligning feature aids in accomplishing an effective positioning of disc 9 in seat 1.

The materials of construction of the swinging disc valve of the present invention are obvious and in any case are generally not critical. Body 5, shafts 13 and 33, disc arm 7, stem 19 and the like are preferably made of metal. Disc 9 can also be metal, or can be soft seated, or can be metal with a soft seat such as an O-ring. Alternatives in the use of materials of construction are generally obvious.

Surface 41 of disc arm 7 can be perfectly smooth or can contain channel-like grooves which serve as races for rollers 37.

Stem 19 and handwheel 25 can be replaced by any suitable means for applying a downwardly directed force to operator assembly 31. Thus, the force can be applied manually, by compressed air, hydraulically, electrically or the like.

While it is not absolutely necessary that there be two outer rollers 35 and two inner rollers 37, the use of multiple rollers in operator assembly 31 greatly reduces the strain that would otherwise be applied to assembly 31 or to a single track 39 and accordingly, normally prevents galling and limits frictional wear. Accordingly, the use of at least two outer rollers 35 and at least two inner rollers 37 is definitely preferred in accordance with the present invention. Likewise, of course, the swinging disc valve of the present invention preferably comprises two tracks 39 designed to flare into body 5 for greater strength.

It is pointed out that the design of surface 41 shown in FIGURES 1 and 2 is greatly preferred. Said design, preferably coupled with continuous and direct contact between surface 41 and rollers 37 especially when disc arm 7 (and disc 9) is in the open position (see FIGURE 2), upon actuation of operator assembly 31 in the downwardly direction, provides for rapid downward movement of disc arm 7 (and disc 9) at the beginning when there is a minimum of force exerted thereon. As disc arm 7 moves downwardly, and accordingly together with disc 9 is exposed to increasing pressure and force, the rapidity of downward movement decreases until finally rollers 37 slowly but inexorably wedge disc 9 into seat 1.

Figure 5:
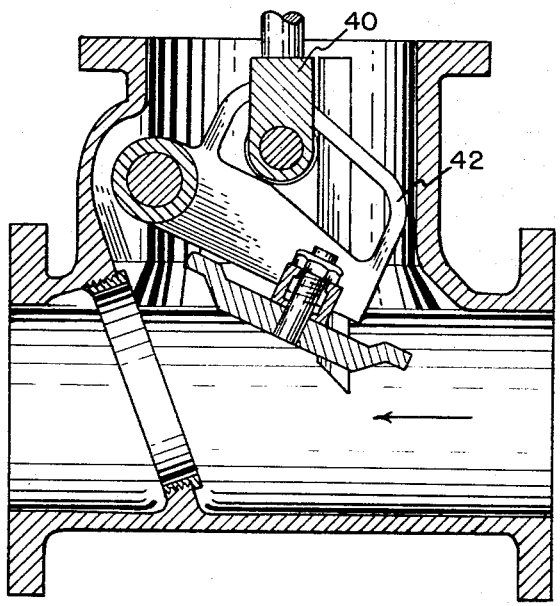
FIGURE 5 is a cross-sectional view of a different embodiment of the present invention.

Obviously, many changes can be made in the present disclosure without departing from the scope of the present invention. For example, the valve of the present invention can be utilized so that flow is in the direction of tending to close disc 9, with operator means 40 (FIGURE 5) on shaft 13 being used when desired to hold disc arm 7 and disc 9 in the open position. Note in this case, disc arm 7 would necessarily comprise a loop means 42 which engages rollers 37. Also, tracks 39 would be positioned on the other side of rollers 35 (and 37). Thus, the wedging action of the present invention can be utilized to open the valve where the pressure acting on disc 9 tends to maintain disc 9 closed. Accordingly, it is intended that the present disclosure be regarded as illustrative and as in no sense limiting the scope of the present invention.

What I claim is:

1. An improved combination stop and check valve which comprises a body portion having an inlet and an outlet, free swinging means within said body portion adapted to swing toward and away from and to seal said inlet, tracks within said body portion positioned to face said inlet, roller means adapted to move along said tracks, means associated with said roller means but not physically connected to said swinging means adapted to force said swinging means against said inlet when said roller means move along said tracks, and means to move said roller means along said track.

2. An improved combination stop and check valve which comprises a body portion having an inlet and an outlet, free swinging means within said body portion adapted to swing toward and away from and to seal said inlet, tracks within said body portion positioned to face said inlet, roller means adapted to move along said tracks, axially movable stem means extending through said body portion on a plane parallel to said tracks connected to said roller means, means adapted to force said swinging means against said inlet as said stem means moves into said body portion connected to said stem means only, and means to cause said stem means to move into and out of said body portion.

3. An improved combination stop and check valve which comprises a body portion having an inlet and an outlet, free swinging means within said body portion adapted to swing toward and away from and to seal said inlet, tracks within said body portion positioned to face said inlet, a first set of roller means adapted to move along said tracks, axially movable stem means extending through said body portion and connected to said roller means adapted to move said roller means along said tracks, and a second set of roller means connected to said stem means only and adapted to force said swinging means against said inlet as said stem moves axially.

4. An improved combination stop and check valve which comprises a body portion having an inlet and an outlet, free swinging means within said body portion adapted to swing toward and away from and to seal said inlet, tracks within said body portion positioned to face said inlet, two sets of roller means positioned on an axle means, one set of said roller means adapted to move along said tracks, the other set being unconnected to said swinging means but being adapted to force said swinging means against said inlet as said first set moves along said tracks and axially movable stem means extending through said body portion and connected to said roller means adapted to move said first set of rollers along said tracks.

5. An improved combination stop and check valve which comprises a body portion having an inlet and an outlet, free swinging means within said body portion comprising an arm keyed on one end to shaft means supported by said body portion and connected on the other end to disc means adapted to seal said inlet, said swinging means being adapted to swing toward and away from said inlet, tracks within said body portion positioned to face said inlet, two sets of roller means on an axle, one set of said roller means positioned to move along said tracks, the other set though unconnected to said swinging means positioned to force said swinging means against said inlet as said first set moves along said tracks, and axially movable stem means extending through said body portion and connected to said roller means adapted to move said first set of rollers along said tracks.

6. The valve of claim 5 wherein said disc means is connected to said arm so as to allow some play therebetween.

7. The valve of claim 5 wherein said tracks, arm and disc means are positioned so as not to block said inlet when said valve is open.

References Cited

UNITED STATES PATENTS

| 1,592,986 | 7/1926 | Martin | 251—158 |
| 2,699,318 | 1/1955 | Ellison | 251—158 |
| 2,999,666 | 9/1961 | Sjogren | 251—82 |

FOREIGN PATENTS

| 73,711 | 8/1917 | Germany. |
| 566,043 | 8/1957 | Italy. |
| 15,698 | 1/1927 | Netherlands. |

CLARENCE R. GORDON, *Primary Examiner.*